(12) United States Patent
Suydam

(10) Patent No.: US 8,973,592 B2
(45) Date of Patent: Mar. 10, 2015

(54) HANDS-FREE PAINT ROLLER CLEANER

(76) Inventor: Donald Suydam, Spokane, WA (US)

( * ) Notice: Subject to any disclaimer, the term of this patent is extended or adjusted under 35 U.S.C. 154(b) by 137 days.

(21) Appl. No.: 13/210,442

(22) Filed: Aug. 16, 2011

(65) Prior Publication Data

US 2012/0037194 A1  Feb. 16, 2012

Related U.S. Application Data

(60) Provisional application No. 61/373,874, filed on Aug. 16, 2010.

(51) Int. Cl.
*B08B 3/12* (2006.01)
*G06F 21/62* (2013.01)
*G06F 21/64* (2013.01)

(52) U.S. Cl.
CPC .......... *G06F 21/6209* (2013.01); *G06F 21/645* (2013.01); *G06F 2221/2111* (2013.01); *G06F 2221/2137* (2013.01); *Y10S 134/90* (2013.01)
USPC .......................................... 134/200; 134/900

(58) Field of Classification Search
USPC .......... 134/900, 172, 175, 177, 178, 198, 200
See application file for complete search history.

(56) References Cited

U.S. PATENT DOCUMENTS

| | | | |
|---|---|---|---|
| 2,519,259 A * | 8/1950 | Liebman | 15/89 |
| 3,688,785 A * | 9/1972 | Stevens et al. | 134/138 |
| 4,377,175 A | 3/1983 | Fritz | |
| 4,508,465 A * | 4/1985 | Orton | 15/1 |
| 4,708,152 A | 11/1987 | Hibberd | |
| 4,809,722 A | 3/1989 | Pennise | |
| 4,832,066 A | 5/1989 | Shipman | |
| 5,005,598 A * | 4/1991 | Hodgdon | 134/138 |
| 5,050,626 A | 9/1991 | Brockage | |
| 5,337,769 A | 8/1994 | Howe | |
| 5,816,275 A * | 10/1998 | Mullen | 134/141 |
| 5,935,342 A | 8/1999 | Boyd | |
| 2008/0105284 A1 * | 5/2008 | Bates | 134/198 |

* cited by examiner

*Primary Examiner* — David Cormier
(74) *Attorney, Agent, or Firm* — Daniel Boudwin; Global Intellectual Property Agency LLC

(57) ABSTRACT

A paint roller enclosure and cleaning device is disclosed that eliminates the need for a user to manually clean a roller tool after its use. The device comprises an enclosure with an interior volume wherein a used paint roller is secured. A spray pipe with a plurality of apertures directs fluid directly onto the roller. Feed for the spray pipe is controllable by a ball valve that regulates the flow of fluid, updating the intensity and volume of fluid being entered into the enclosure. When flowing, the fluid sprays from the spray pipe within the enclosure directed at a paint roller and handle. The roller is forcibly rotated by the spray fluid and cleaned of residual paint and debris without requiring the user to do so by hand. Fluid then drains through a drainage hole at the base of the enclosure, into a flex pipe and into a drain or appropriate container. A transparent covering is provided over the upper surface of the enclosure to allow visualization of the cleaning process and to prevent fluid from escaping or spraying the user. Optionally, an air hose may be attached to the enclosure to dry the roller following cleaning.

8 Claims, 1 Drawing Sheet

HANDS-FREE PAINT ROLLER CLEANER

CROSS REFERENCE TO RELATED APPLICATION

This application claims the benefit of U.S. Provisional Application No. 61/373,874 filed on Aug. 16, 2010, entitled "Hands Off Paint Roller Cleaner."

BACKGROUND OF THE INVENTION

1. Field of the Invention

The present invention relates to cleaning devices and enclosures therefor. More specifically, the present invention relates to a paint roller cleaning device that separates the user from the process to avoid messy or excessive cleaning thereof.

The use of paint roller tools for applying paint has become increasingly popular for individuals and for contractors. Painting with a roller is substantially easier and faster than painting with a brush, especially on large, flat surfaces such as walls and ceilings. In addition, it is generally recognized that relatively less skill is required to produce comparable results using a paint roller device when painting. Paint rollers are comprised of a handle device and a rotating assembly that supports a removable brush. The brush is adapted to rotate and apply a layer of paint as the tool is advanced along a surface. The removable brush comprises a cylindrical tube with an outer layer of fabric, fibrous or plastic material capable of absorbing and distributing paint in a rolling process.

After use, the paint roller can be cleaned for reuse or discarded depending on its cost, the given situation or user preferences. Many paint rollers can be expensive to replace, which justifies the effort required to clean and reuse the roller brush. Cleaning typically involves either soaking the paint roller in a suitable paint solvent or, in the case of a typical homeowner using water-soluble latex paints, washing the paint roller in a sink with soap and water. Cleaning a paint roller can present a messy and time-consuming operation that can lead to paint splattering. The splattering of paint can stain or damage clothes and spread paint onto articles immediately in vicinity to the cleaning environment. Casual cleaning of the roller further may not remove all the residual paint from the roller brush. Any paint remaining after cleaning may contaminate the paint being used in the next succeeding painting operation. It can also clog the brush and make it less efficient at absorbing and distributing paint after its initial use. As a result, commercial and professional painters often avoid the inconvenience and mess required to clean roller covers, discarding the roller after only one use.

For individual users, cleaning a paint roller by the aforementioned method is an aggravating and time consuming task. Typically, a roller must be cleaned by hand, which is messy and requires cleanup of the sink or basin used to clean the roller. This process takes away time from other tasks or cleaning other supplies. If more than one roller requires cleaning, the task may take even longer. A more efficient means for cleaning paint rollers is needed.

2. Description of the Prior Art

Several patents have been granted for devices related to the cleaning of a paint roller. However, these prior art devices have several known drawbacks. Several require the user to make manual contact with the used roller to facilitate the cleaning process. Still others do not provide a means to clean the handle or structure of the roller. The present invention provides a device that cleans both the handle and removable brush of the paint roller without user intervention and without splatter or contamination risk.

Several patents require the user to physically engage the roller brush, separate it from the handle and place it within another device. Fritz, U.S. Pat. No. 4,377,175 is one such device directed to a pair of frustoconical bearings for supporting a paint roller brush and carried within an elongated cylindrical container. One bearing is affixed to a closed end of the container while the other is affixed to a cap detachably securable to the open end. Cleaning fluid is directed toward the applicator from a plurality of orifices spaced along conduits extending longitudinally within the container. The axis of each orifice is at a compound angle to urge the rotation of the applicator and to hold the applicator toward the closed end of the container.

Similarly, Hibberd, U.S. Pat. No. 4,708,152 is directed to a cleaning device for removing water-soluble paint from a paint roller. The roller to be cleaned is placed over a roller holder that is rotatably mounted in a vertical position within a container. A plurality of fan type jets are supported from an inlet water manifold. These fan jets are positionally adjusted to direct a thin wall of water essentially tangent to the paint roller to cause the roller to rotate and to contact rinsing water on every point of the roller surface.

Additionally, Boyd, U.S. Pat. No. 5,935,342 is directed to a paint roller cleaner consisting of a tubular body holding a covered paint roller, along with a traversing nozzle spraying a liquid whereby the roller is cleaned after use.

The Fritz, Hibberd and Boyd inventions all require the cylindrical roller brush to be removed from the handle prior to cleaning. This presents an extremely messy and frustrating process. Further, these devices do not provide a means to clean the handle portion, which remains outside of the device while the roller is attended to. The present invention cleans both the handle and the applicator simultaneously, without the need for disassembly.

Other issued patents do not allow the user to visually inspect the cleaning process to determine completion. Pennise, U.S. Pat. No. 4,809,722 is directed to a paint roller cleaner constructed of a container defining an enclosed internal chamber adapted to receive and contain a paint roller. Further defined is a lid for enclosing the upper end of the container, a drain at the lower end of the container providing a liquid discharge passage, and a water supply conduit arranged to direct a stream of water into the chamber for impingement upon a roller contained therein for cleaning.

Similarly, Shipman U.S. Pat. No. 4,832,066 is directed to a device for performing the controlled cleaning of paint rollers, comprising a housing for containing fluid transport tubing and spray heads for expelling a high pressure spray, which is directed at the sides of said paint roller to produce a spinning and cleaning action. Tubing provides fluid communication through the wall of the lower housing, with a gate valve and female coupling housing supplying fluid to spray heads. A funnel functions to collect and downwardly channel waste fluid, and is mounted inside and just below the top rim of the lower housing with a spout portion pointing downward. This orientation allows for a single stream of waste fluid drainage. Also affixed is an exterior bracket means for supporting the handle portion of the paint roller, horizontally and outside of housing, wherein the roller portion is affixed vertically and inside of housing between two vertical fluid transport tubes comprising spray heads.

Additionally, Brockage U.S. Pat. No. 5,050,626 is directed to an improved cleaner for a paint roller in which the cleaner includes a container having an opening for receiving a paint roller and a groove in a side wall thereof for releasably mounting the handle of the paint roller to the container. The roller is held in a fixed location and struck by water streams from a manifold within the interior of the body. The manifold is connected to a handle outside the container, and is pivotally mounted so that the manifold can rotate through a limited arc to change the angle of impingement of the water streams from the manifold onto the paint roller to be cleaned. The handle of the container body has a serrated structure for releasably locking the paint roller handle to the body of the cleaning device with a manifold in any one of a number of positions. Thus, depending upon the diameter of the roller, the angle of the water streams impinging from the manifold onto the roller to be cleaned can be varied so that paint rollers of different diameters can be accommodated within the apparatus.

The Pennise, Shipman and Brockage devices clean the applicator portion of the paint roller and some portion of the handle. These devices do not allow the user to inspect or observe the cleaning process, and therefore provide no means to determine completion without opening the device. The present invention allows the user to observe the cleaning process through a transparent window mounted along the top surface of the cleaning enclosure. The window is secured to the housing by a hinge and a gasket the surrounds the perimeter of the enclosure opening, wherein the window is placed when in a working position. Additionally, the present invention cleans the entire handle portion of the roller.

Other issued patents, while providing simplicity, require the user to clean the roller while spraying a water supply through and opening. Howe, U.S. Pat. No. 5,337,769 is directed to a paint roller cover cleaning device comprising a drum having a perforated base, a cylindrical sidewall and an open top fitted with a removable lid. The device has a support member for frictionally engaging a paint roller cover rotatably secured to the base of the drum. The cylindrical sidewall has a vertical slot opening that allows the user to direct a pressurized stream of solvent from a nozzle against the outer periphery or nap of the paint roller cover. The Howe device requires the user to direct the cleaning solution and perform the cleaning operation, while the present invention requires no user intervention during the cleaning process.

While other issued patents have introduced devices that attempt to clean a paint roller, none of the prior art devices allow the user to clean the entire paint roller, both the handle and applicator, without user intervention. Further, the prior devices do not allow an easy manner of inspection during the cleaning operation or a means to determine completion of cleaning. There is a need in the art for a cleanly, easy to use device for cleaning entire paint roller assemblies without requiring the user to manually handle or operate any item while operating the device. The present invention fulfills this need by providing a device that cleans a paint roller without manually handling the roller or introducing splatter from the roller paint or fluids used for its cleaning. The present invention substantially diverges in design elements from the prior art and consequently it is clear that there is a need in the art for an improvement to existing paint roller cleaning devices. In this regard the instant invention substantially fulfills these needs.

SUMMARY OF THE INVENTION

In view of the foregoing disadvantages inherent in the known types of paint roller cleaners now present in the prior art, the present invention provides a new cleaning device wherein the same can be utilized for providing convenience for the user when cleaning any type of paint roller, including both the handle and roller portions.

The present invention provides a quick and easy device for cleaning a paint roller tool. The present invention is suitable for use by contractors, homeowners or any individuals who frequently make use a paint roller or require multiple uses of the same roller. The present device effectively washes and dries a roller without the need for the user to be involved in or oversee the process. The individual may place the roller into the device for cleaning while attending to another task, such as closing up paint cans, collecting brushes, putting tools away or other ancillary cleaning or painting tasks.

It is therefore an object of the present invention to provide a new and improved paint roller cleaning device that has all of the advantages of the prior art and none of the disadvantages.

The primary object of the present invention is to provide an improved paint roller cleaner apparatus which is simple and rugged in construction, and can be operate independently to clean a paint roller without user intervention.

Another object of the present invention is to provide a device that is capable of supporting the entire paint roller tool within the interior of the device, allowing complete coverage and cleaning thereof.

Another object of the present invention is to utilize a high pressure spray directed at the paint roller to facilitate rotation of the roller while cleaning. The inertia of the paint on the outside surface of the roller, along with direct contact with the sprayed fluid, releases the residual paint from the roller during operation.

Another object of the present invention is to provide a device that supplies connections to incoming fluid, as well as a connection that allows collection of used fluid after being utilized in the cleaning process.

Yet another object of the present invention is to provide a cleaning enclosure with a transparent viewing window to allow inspection of the cleaning process and determination of its status.

A further objection of the present invention is to provide a paint roller cleaner that does not require any special skills and has relatively few moving parts, so as to render the cleaner apparatus efficient in both use and maintenance.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself, and manner in which it may be made and used, may be better understood by referring to the following description taken in connection with the accompanying drawings.

DETAILED DESCRIPTION OF THE INVENTION

Figure 1:
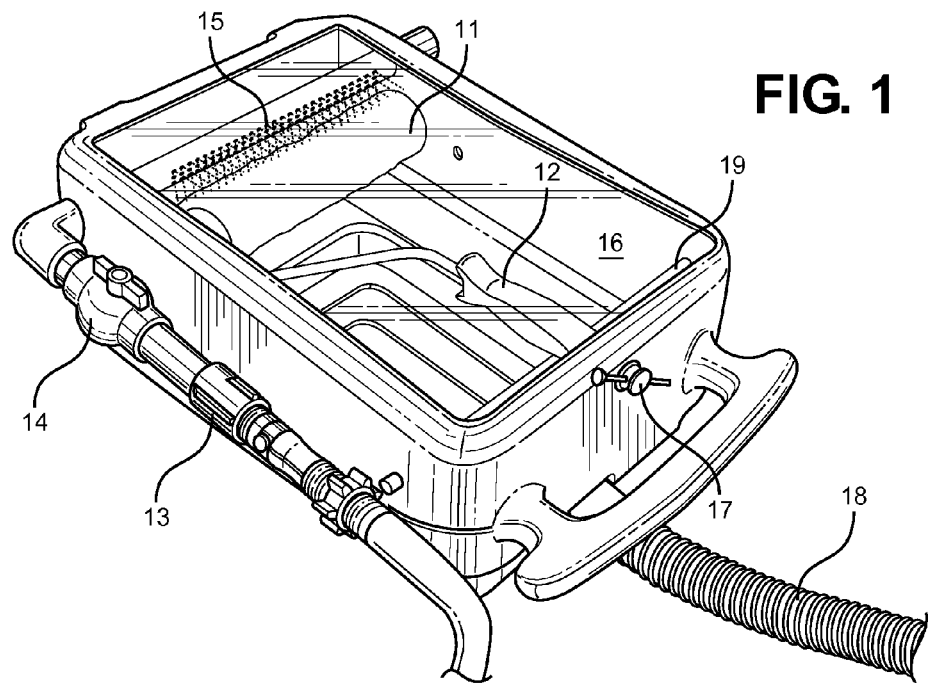
FIG. 1 is a perspective view of the present invention in a working position, wherein a paint roller is being cleaned within the cavity of the paint cleaner enclosure.

Reference is made herein to the attached drawings. Like reference numerals are used throughout the drawings to depict like or similar elements of the paint roller cleaning device. For the purposes of presenting a brief and clear description of the present invention, the preferred embodiment will be discussed as used for cleaning paint rollers in an efficient and user independent fashion. The figures are intended for representative purposes only and should not be considered to be limiting in any respect.

Referring now to FIG. 1, there is shown a perspective view of the present invention in a working position. A paint roller, including a handle portion 12 and a roller brush 11, is secured within an enclosure defining a largely rectangular structure with an interior volume. The roller handle 12 is held within the enclosure in a suspended position by a supporting brace 19 and attachment means 17 that engages the end of the paint roller handle from an enclosure sidewall. The attachment means 17 may be provided in the form of a screw that engages the roller handle 12 or a wing nut that screws into or accepts a nut originating from the end of the roller handle. The top surface of the enclosure is a transparent lid 16 that is hingeable or alternatively completely disengageable from the enclosure. The lid 16 is secured to the enclosure using a gasket that lines the perimeter of the enclosure opening, sized to create a water tight seal between the enclosure opening and the lid 16 when in a closed position.

The enclosure supports a water supply means by way of a quick disconnect valve 13 that rapidly engages and disengages from a water supply line and a ball valve 14 that controls the flow of water from the supply line into the enclosure cavity. Within the enclosure and downstream of the ball valve 14 is a section of pipe with pinhole apertures 15 disposed about a length facing the suspended roller 11. When fluid is permitted to enter the section of pipe via the ball valve 14 and supply line, the apertures 15 function as a high pressure spray means that allow water to exit the section of pipe through the apertures, which then function as individual nozzles. The high pressure spray is directed at the paint roller 11 and the handle 12 to clean both items during operation. The spray is directed tangentially at the roller brush 11 to facilitate rotation thereof, allowing the entire surface to be treated by the spray means. The high pressure spray induces a considerable rotational velocity on the roller that further facilitates removal of paint and debris by means of radial inertia, which functions to separate the two during operation. Direct application of the spray also affirmatively removes those particles or layers of residual paint that are not immediately dispersed via the rotation of the roller. Removed paint and spray fluid collect along the base of the enclosure while cleaning, which is then evacuated through a drainage hole that connects to an attachable flex tube 18 evacuation pipe. The flex tube 18 can be directed to an appropriate collection device or drain.

Figure 2:
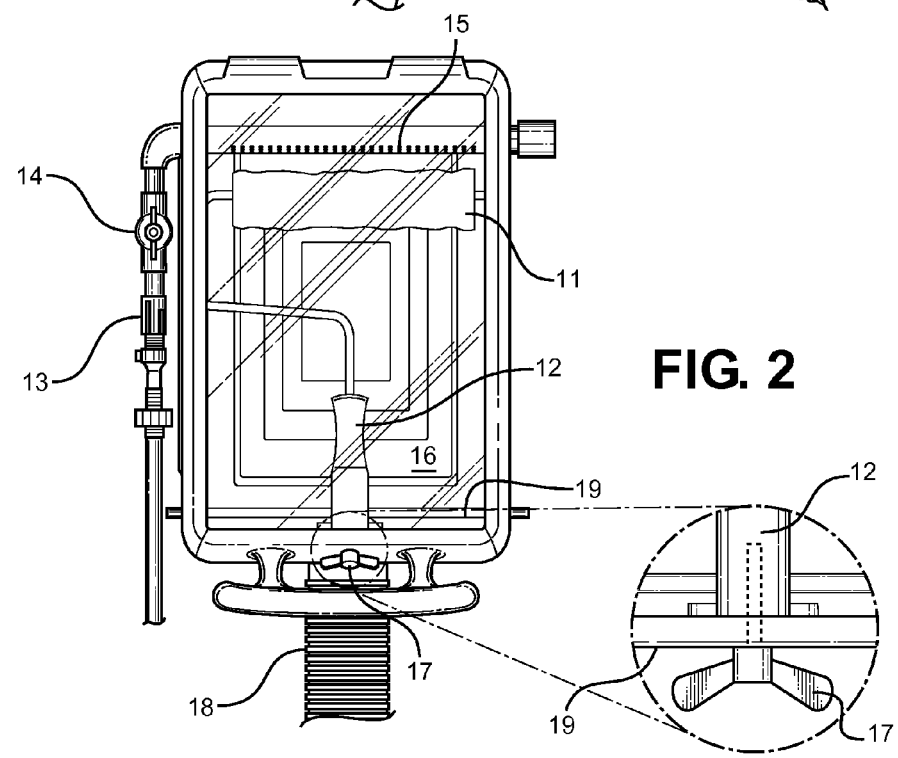
FIG. 2 is an overhead view of the present invention in a working position.

Referring now to FIG. 2, there is shown an overhead view of the present invention in a working position. A paint roller is shown secured within the enclosure and the lid 16 is shut for operation of the spray means. At the base of the enclosure is a drainage hole and attachable flex tube 17 through which water and residual paint can be drained during operation. The lid 16 is sealed with a rubber gasket around its perimeter edge to prevent leakage, while its transparency allows inspection of the roller to determine when the roller brush 11 and handle 12 have been sufficiently cleaned. After all paint has been removed from the paint roller and the residual fluid has drained from the enclosure, the water supply line can be removed from the quick disconnect 13 and replaced with a compressed air hose. The connection of a compressed air hose forces air through the apertures 15 to dry the device without manually handling it prior to its complete drying. After drying, the handle 12 can be disconnected from the enclosure sidewall and reused or stored accordingly.

The disclosed cleaning device provides an easy to use means for cleaning a paint roller. The device comprises of a simple, yet rugged enclosure that is preferably constructed of a plastic material. The lid 16 is preferably a transparent plastic material as well, such as Plexiglas. There spray means 15 is designed to work with both liquid and air to provide a device that can pressure wash and dry a paint roller of interest, eliminating the need for a user to manually handle the device during any step of the cleaning process. The handle of the roller 12 can be fixed with an attachment means, or alternatively be fitted with a female threaded portion to accept the handle attachment means 17. This allows the end of the paint roller handle 12 to directly engage and cantilever from the sidewall of the enclosure, while a support brace 19 supports the handle along its length and allows the roller brush 11 to be suspended in front of the spray means 15.

Construction of the device provides for a rugged, easy to manufacture and clean device with minimal loose parts or methods of use to learn. A handle may be provided along the exterior of the enclosure to allow a user to quickly grasp and transport the device in a working environment, while the quick disconnect 13 provides a rapid means to connect a water supply line or place the nozzle of a compressed air line therein.

In use, a user places the entire paint roller into the enclosure and affixes it in place using the brace 19 and wing nut 17. The brace 19 accommodates any standard sized paint roller handle. Horizontal adjustment may be included in order to accommodate larger rollers or handles thereof. The user then closes the lid 16 to seal the enclosure and connects the water supply line. The spray means is controlled using the ball valve 14, causing the spray pipe to pressure wash and spin the roller about its rotational support. Use of a ball valve 14 allows the user to adjust flow of fluid as needed, preventing waste. Further, angle of the apertures 15 may be rotated by the user to aim the spray means at a specific area of the roller brush, thoroughly cleaning its entire perimeter surface. During operation, the user can leave the device operating without intervention; water is drained out a drainage hole and evacuated away through the attachable flex tube 18 to a container or sink drain. The clear lid 16 allows the user to determine completion to reduce waste water, and eliminate any need to open the device to check on the cleanliness of the roller. Optionally, the roller may then be dried using an air compressor that forces air through apertures 15 and over the roller brush 11.

While this device is ideally suited for water-based latex paints, wherein a water supply line such as a garden hose can be attached to the quick disconnect 13, it is contemplated that a solvent mixture can be alternatively attached and utilized in the cleaning process. In this alternative instance, the drainage pipe 18 should be directed to an appropriate containment vessel, and not drained into a sewer system.

Overall, the device allows a user to clean and dry a used paint roller with minimal oversight or contact therewith. The device contains all cleaning fluids and prevents inadvertent overspray, which can stain or contaminate nearby surfaces or clothes. The device further accelerates the clean up process, as the device can be utilized with minimal oversight while other activities are attended to, and then used for multiple, consecutive cleaning operations if required. When completed, the device is drained, washed and dried prior to storage or transport from the job site. If necessary, the base of the device can be secure to a working surface for long-term or successive use.

To this point, the instant invention has been shown and described in what is considered to be the most practical and preferred embodiments. It is recognized, however, that departures may be made within the scope of the invention and that obvious modifications will occur to a person skilled in the art.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for supporting and cleaning a paint roller having a roller portion, a handle portion, and a shaft portion connecting said roller portion and said handle portion, comprising:
   an enclosure having an interior volume, sidewalls, an open upper region, a drain hole, and a quick disconnect valve connection adapted to engage a fluid supply line;
   said open upper region covered by a lid;
   said fluid supply line comprising a ball valve to control fluid flow therethrough mounted exteriorly of said enclosure;
   said supply line further comprising a portion of pipe within said enclosure having a spray means disposed along its length;
   a paint roller support disposed on said enclosure sidewalls oppositely to said spray means;
   said paint roller support adapted to support said paint roller in a suspended position such that said handle portion cantilevers from said enclosure sidewalls and said roller portion is positioned adjacent to said spray means;
   said paint roller support comprising a fastener adapted to engage said handle portion through an aperture in said sidewalls and a support bar disposed within said enclosure interior volume;
   an evacuation tube attached to said drain hole for removing fluid.

2. A device as in claim 1, wherein said spray means comprises a plurality of apertures forming nozzles to flow fluid therethrough.

3. A device as in claim 1, wherein said portion of pipe is rotatable within said enclosure to change said spray means orientation.

4. A device as in claim 1, wherein said fastener is a wingnut and threaded bolt through said handle.

5. A device as in claim 1, wherein said enclosure forms a rectangular structure having an enclosure handle disposed about an exterior surface.

6. A device as in claim 1, wherein said enclosure is securable to a base structure.

7. A device as in claim 1, wherein said lid comprises a transparent window.

8. A device as in claim 1, wherein said enclosure interior volume and said lid are adapted to completely enclose said paint roller.

* * * * *